United States Patent [19]

Aspinwall et al.

[11] 4,385,269
[45] May 24, 1983

[54] BATTERY CHARGER

[75] Inventors: John F. Aspinwall, Purley; Ronald A. Barrs, Crawley; Carl S. den Brinker, London; John R. Emmett, Hampton, all of England

[73] Assignees: Redifon Telecommunications Limited; Thames Television Limited, both of London, England

[21] Appl. No.: 223,834

[22] Filed: Jan. 9, 1981

[51] Int. Cl.³ .............................................. H02J 7/10
[52] U.S. Cl. ...................................... 320/14; 320/20; 320/21; 320/35
[58] Field of Search ................. 320/14, 19, 20, 2, 122, 320/35, 36

[56] References Cited

U.S. PATENT DOCUMENTS 3,597,673 8/1971 Burkett et al. .................... 320/22 X
3,614,583 10/1971 Burkett et al. .................... 320/21 X
3,808,487 4/1974 Feuillade ............................ 320/21
3,938,021 2/1976 Kosmin .............................. 320/40
4,255,698 3/1981 Simon ................................ 320/35

Primary Examiner—R. J. Hickey
Attorney, Agent, or Firm—Laurence R. Brown

[57] ABSTRACT

A battery charger is provided which supplies pulses of charging current to a battery and discharges the battery between each charging pulse. The change in the battery terminal voltage over a predetermined period during each charging pulse is measured, and the pulse charging is terminated when a parameter of the measured voltage change exhibits a predetermined characteristic. Pulse charging may be terminated as a result of the measured voltage change exceeding a predetermined threshold or as a result of the detection of a point of inflexion in the variation of measured voltage change with time.

14 Claims, 18 Drawing Figures

BATTERY CHARGER

The present invention relates to battery chargers, and in particular to battery chargers for charging batteries at a high rate. The invention is applicable to nickel-cadmium and other types of battery.

Nickel-cadmium (NiCd) batteries have found wide acceptance in many fields, including portable radio telephone systems, because of their ability to be charged and discharged over a very wide operational temperature range, their inherently low internal resistance, their long life, and the fact that they can be fully sealed. These features make the battery particularly suitable for military use.

It is well known that NiCd batteries are damaged if overcharged. The equation which describes the chemical behaviour of a NiCd battery is given as follows:

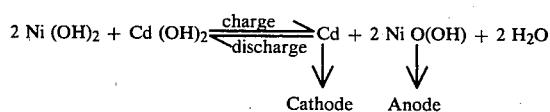

This equation does not give any indication of the intermediate ionic states which must occur, for example the attachment of one of the hydrogen atoms to an (OH) group to provide water.

Overcharging of a NiCd battery returns hydrogen to the cathode as if a partial discharge had taken place. This precarious balance between apparent discharge and charge at the cathode means that a surfeit of energy must be present, in this case heat. As hydrogen is used up in this fashion, a build up of oxygen occurs, and in the case of excessive overcharge the oxygen is released through safety vents. It is imperative that any long life consideration of batteries must include methods for minimising excessive gassing, as once oxygen has been vented the resulting imbalance within the battery cannot be corrected.

The risks of damage due to overcharging are relatively slight if the charging current is limited, but if batteries are to be rapidly charged, e.g. at a rate of the order of $C \times 7$ where C is the rated charging capacity of the battery, as is desired in many of the environments where NiCd batteries find applications, means must be provided for detecting when the battery is fully charged or almost fully charged and then terminating the charge. Overcharging at high rates can make NiCd batteries dangerously explosive.

Many proposals have been made for charging batteries by forcing pulses of current through the battery and monitoring the battery charge state at the termination of each pulse. For example, British Pat. No. 1 219 324 describes a pulse charging system in which the battery is initially charged continuously and then pulse-charged. The battery is discharged after each pulse and the charge is stopped in dependence upon the average discharge current or the ratio of the energy removed by the discharge to the energy put in during the preceding charging step. British Pat. No. 1 293 983 describes a modified arrangement in which the terminal voltage of the battery is sampled between pulses a predetermined time after the commencement of the discharge. None of the proposed systems have proved altogether satisfactory however because of the particular characteristics of NiCd batteries.

NiCd batteries have a very low internal resistance and therefore simply loading the battery as is done with lead/acid batteries does not give a clear charge status indication. The terminal voltage of NiCd batteries does not change very much in response to variations in the charge status and is therefore not an adequate measure of the charge status. Furthermore, the terminal voltage can be affected by temperature variations by an amount similar to charge variations. This latter point is of particular consequence as battery temperature increases by a significant amount during rapid charging. In fact, one rapid charger has been proposed which relies on the differential temperature between the inside and outside of the battery casing to terminate rapid charging.

A further problem with known rapid battery chargers is that it is difficult to achieve better than 80% charge acquisition.

It is an object of the present invention to provide an improved rapid battery charger which can overcome or reduce the problems referred to above.

According to the present invention there is provided a battery charger comprising means for supplying pulses of charging current to a battery and means for discharging the battery during the interpulse period, characterised by means for measuring the change in the battery terminal voltage over a predetermined period during a charging pulse or the interpulse period, and means for terminating the pulse charging of the battery when a parameter of the measured voltage change exhibits a predetermined characteristic.

In a simple embodiment of the invention, the pulse charging of the battery is terminated when the measured voltage change exceeds a predetermined threshold.

Preferably the change in the battery terminal voltage is measured during a period starting at the beginning of a charging pulse.

Preferably the charger comprises a first current control device connected in series with the battery across a charging current supply, a second current control device connected across the terminals of the battery for the purpose of discharge, a timing circuit for cyclically turning the second current control device on and off, and means for turning the first current control device on when the second current control device is off. The charger may further comprise a monostable circuit triggered by the timing circuit for sampling the battery terminal voltage when the first current control device is turned on and at a predetermined interval thereafter, a comparator for comparing the two sampled voltages, and a bistable circuit for holding both current control devices off when the comparator detects a predetermined difference between the two sampled voltages. Conveniently, the current control devices are transistors.

Means may be provided for changing the rate of charge from a rapid charge to a normal charge rate of approximately $0.1 \times C$ after a battery has completed a fast charge cycle.

In one embodiment of the charger, pulses of current of for example 10 seconds duration are supplied to a battery to be charged, the battery being discharged between each charging pulse for a period of for example 2 seconds. The battery terminal voltage is measured at the beginning of each charging pulse and again a predetermined period such as 2 seconds thereafter. When the battery has been charged, the difference between the two terminal voltage measurements increases. Pulse charging of the battery is automatically terminated as soon as the difference between the two terminal voltages exceeds a predetermined threshold.

The above described charger according to the invention essentially relies on the fact that if a charge/discharge sequence is used with rapid current transitions, the battery terminal voltage does not follow this square wave current envelope, but rather changes voltage at a much slower rate. The amplitude of this change in voltage increases as the battery nears completion of charge. This change in voltage, is used as a sense voltage and compared with a reference voltage so that charge may be terminated at a threshold defined by the reference voltage.

The simple charger described above is effective if used in carefully controlled circumstances, but it cannot be relied upon to handle mixed batches of batteries of various types, conditions and temperatures. The ideal relationship between the measured voltage difference and the "state of charge" would be that the voltage difference remains small until the battery is fully charged, whereafter the voltage difference would increase by, say, one order in a relatively short period of time. This would allow the charge to be terminated easily and accurately. Unfortunately, the voltage difference proves to be variable in amplitude by about 2:1 from one cell to another, does not change dramatically in amplitude when the battery reaches its fully charged state and is subject to an overall amplitude shift of about 3:1 with a change in temperature of 0° C. to 50° C. The result of this is that it is not possible to select a measured voltage difference threshold which will always be certain to detect a fully charged cell at 50° C. and also allow the commencement of charge at 0° C. As batteries may be used in situations where they are exposed to extreme temperatures, e.g. in Arctic regions, but are generally charged in a charging station which is sheltered, the battery temperature can vary considerably during a charging operation simply because of the change of environment. Thus it is of considerable importance to provide a charger which can cope with batteries of widely varying internal temperatures.

Further problems are experienced with the simple charger described above. For example, when a fully discharged battery is to be recharged, the battery terminal voltage initially increases very rapidly. This can result in the difference between the two measured voltages exceeding the predetermined threshold so that pulse charging is terminated before any significant charging of the battery has been achieved. Furthermore, the difference voltage which is to be detected is proportional to the nominal voltage of the battery to be charged, and therefore if a charger is to be adapted to charge a range of batteries by having a voltage selector switch, a single fixed threshold will not be sufficient. Even the simple selection of an operating voltage can cause problems in difficult situations, particularly with inexperienced personnel. In addition the described charger is not able to indicate if the condition of a battery has deteriorated.

Thus a further object of the present invention is to obviate or mitigate the limitations of the simple charger described above.

Accordingly, the present invention also provides a battery charger of the above type, characterised in that means are provided for monitoring the internal condition of the battery and means are provided for modifying the current through the battery to compensate for the monitored internal battery condition such that variations in the measured voltage change with internal battery condition are minimised.

In a commercially available NiCd battery an output is provided which indicates the temperature difference between the interior of the battery and its casing. With such a battery, the charger terminal plugs could incorporate a temperature sensing device so that the internal battery temperature could be derived from the sensing device output in combination with the battery casing-/interior temperature output.

The current modifying means may comprise means for modifying the amplitude of the current in the first portion of each charging pulse such that the amplitude increases with increasing internal battery temperature, and means for modifying the amplitude of the current in a second portion of each charging pulse to maintain the mean charging current substantially constant.

Preferably the charging current amplitude modifying means comprises a first solid state switch connected in series with the battery, a second solid state switch connected between two resistors forming a potential divider and controlled by a signal representative of the internal battery temperature, and switches connecting a control terminal of the first solid state switch to respective sides of the second solid state switch.

Where a battery has an output which indicates the internal battery temperature this important condition of the battery can be directly monitored. Unfortunately most available batteries do not have such an output and it is therefore necessary to indirectly monitor the internal condition of the battery.

Accordingly the invention provides a battery charger of the above type characterised in that the means for monitoring the internal condition of a battery to be charged comprise means for conducting a test charge/-discharge sequence before the main charging sequence, means for monitoring the measured voltage change at the beginning of the test sequence, means for monitoring the measured voltage change after discharge, and means for reducing the charge rate of the main charging sequence if the second monitored voltage change is not substantially less than the first.

If a high voltage change is monitored at the beginning of the test sequence, this could either indicate a cold battery or a charged warmer battery. After the discharge step of the test sequence, if the battery is warm and had been previously fully charged, it will no longer be fully charged so the measured voltage change will be reduced. If the measured voltage change is still high, the battery must be cold and therefore it is essential to select a lower charge rate appropriate to a cold battery.

The above described embodiments of the invention allow for compensation for internal battery temperature but are not always able to handle batteries which exhibit other non-standard conditions. Studies of the variation of the measured voltage change with time have shown that when a viable battery is being charged, in almost all cases a curve of measured voltage change versus time exhibits a point of inflexion shortly before the battery is fully charged. Accordingly a further feature of the invention is the provision of means for detecting a point of inflexion in the variation of the measured voltage change with time, and means for terminating a charge sequence after the point of inflexion is detected.

Some non-viable batteries exhibit no point of inflexion but the curve of measured voltage change versus time goes through a maximum due to increasing temperature if charging is attempted. Accordingly a further feature of the invention is the provision of means for detecting a maximum in the variation of measured voltage change versus time and means for terminating a charge sequence if a maximum is detected in the absence of a point of inflexion.

A further feature of the invention is the provision of timing means to automatically terminate a charging sequence after a predetermined period related to the maximum period for which a battery can be effectively charged. This further feature is necessary as very cold non-viable batteries can accept a charge almost indefinitely without any significant variation in the measured voltage change.

It has been discovered that, to a first approximation, the "charge out/charge in" efficiency of NiCd batteries is reasonably constant over the charge cycle and with cells in various states of decrepitude. Prior art devices for determining the capacity of a battery have initially charged the battery, then fully discharged it to measure the actual capacity, and then recharged it. This is obviously a lengthy and inefficient process.

According to a further feature of the invention, there is provided a battery charger of the above type, characterised in that means are provided to discharge the battery to a predetermined voltage per cell, and means are provided for determining the charge supplied to the battery prior to termination of the charging sequence, the charge supplied being a measure of the capacity of the battery.

Effectively the present invention makes it possible to accurately determine when the battery is charged, and therefore the charge supplied prior to termination is a reasonably accurate measure of the actual battery capacity.

The charge supplied can be determined by measuring the duration of a predetermined charging sequence.

Embodiments of the present invention will now be described, by way of example, with reference to the accompanying drawings, in which:

FIG. 1 is a waveform diagram of the terminal voltage of a battery being charged by a first embodiment of the invention;

FIGS. 2 to 4 together show the circuit diagram of the first embodiment of the invention;

Figure 15:
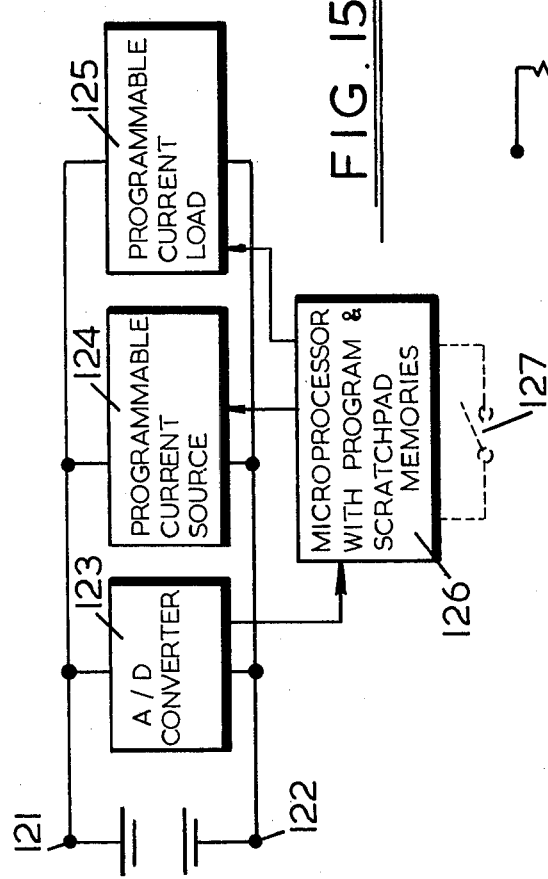
Figure 16:
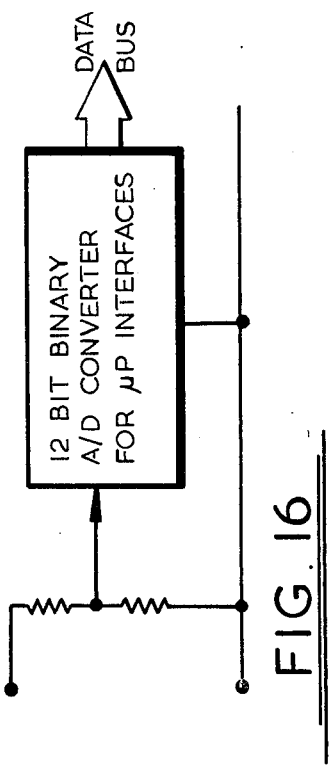
Figure 17:
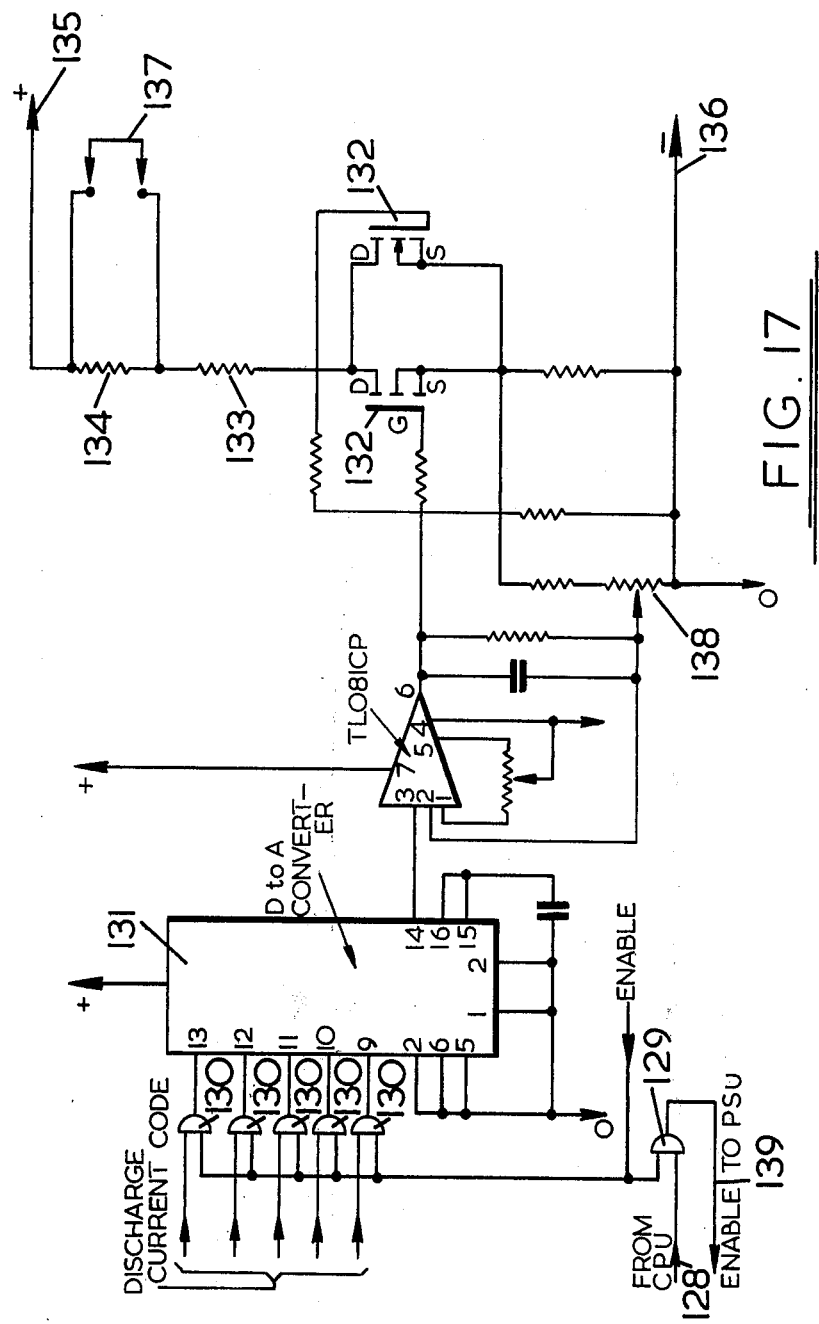
Figure 18:
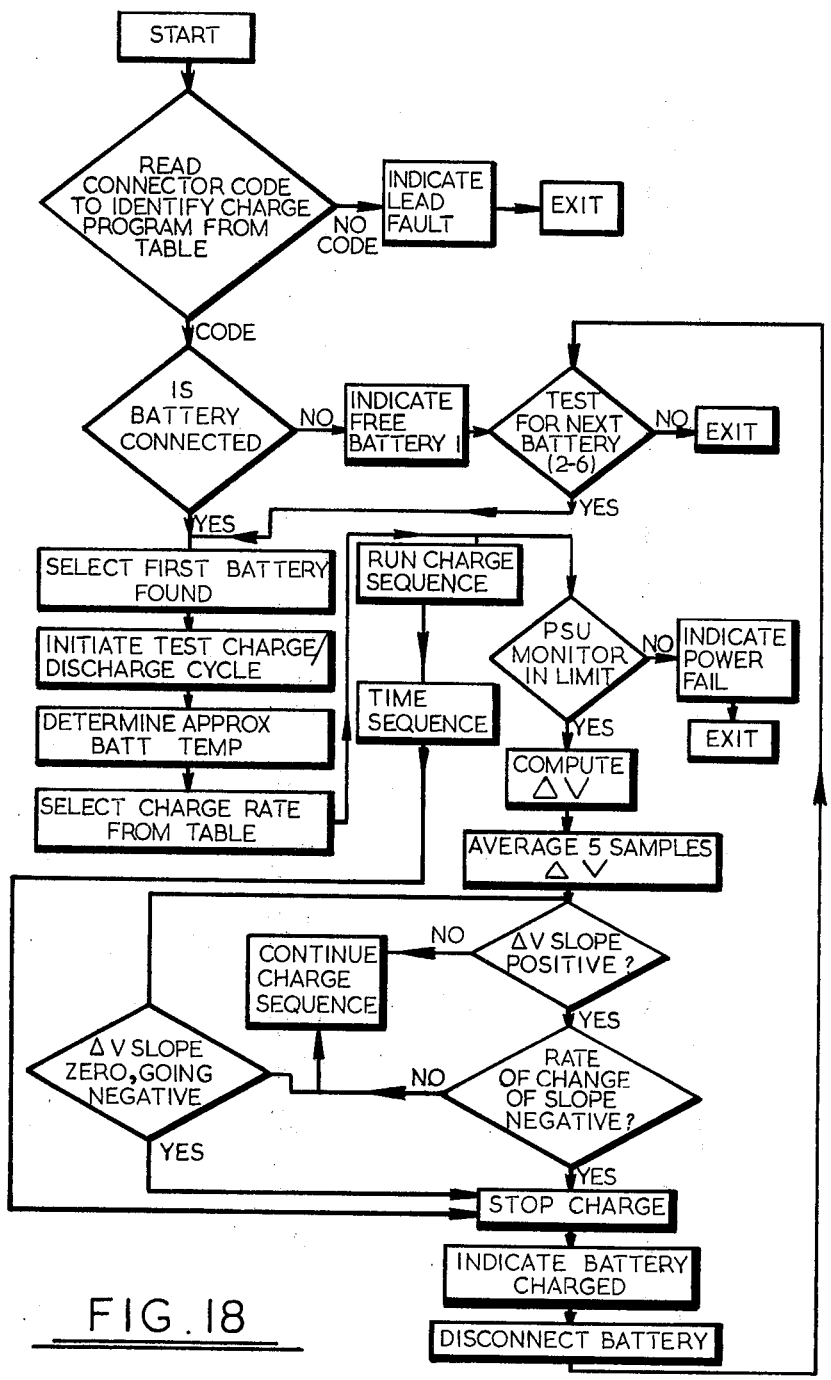

FIG. 15 schematically illustrates a third embodiment of the invention;

FIGS. 16 and 17 show further details of component parts of the third embodiment; and FIG. 18 is a flow diagram illustrating the operation sequence of the third embodiment.

Figure 1:
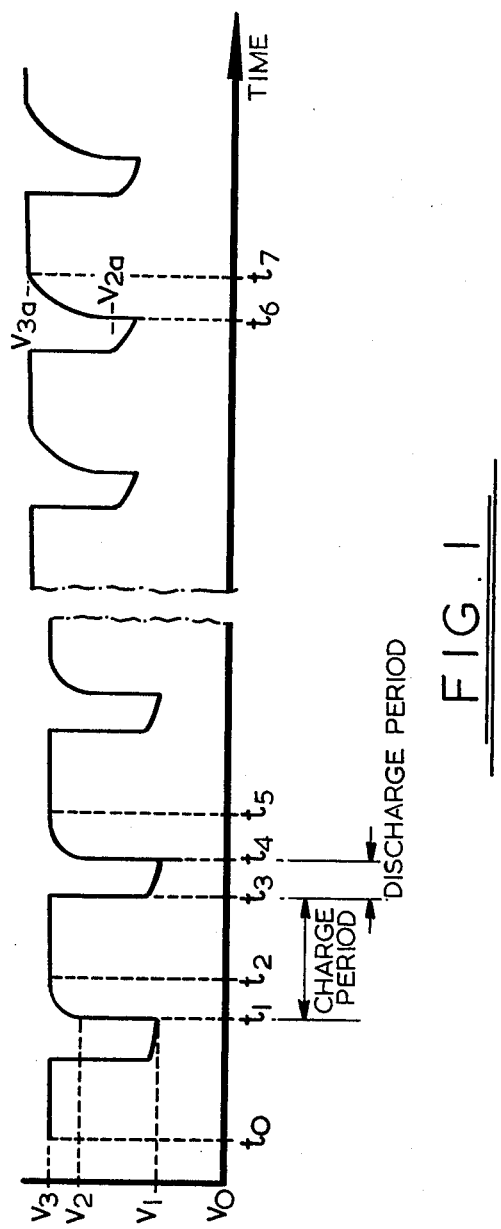

Referring to FIG. 1, it is assumed that a discharged battery is connected to a rapid charger according to the invention at time $t_0$, and that pulse charging is initiated at once. At the first interruption of the charging current the terminal voltage drops to a minimum value of $V_1$. At the commencement of the next charging pulse the voltage rises very rapidly from $V_1$ to $V_2$ at $t_1$, then rises slowly to the level $V_3$ at time $t_2$. It then varies only marginally during the remainder of the charging pulse. The period $t_1 - t_2$ represents the time taken for the voltage to reach a sensible steady state. At time $t_3$ passage of charging current through the battery is automatically terminated and the battery is then discharged for a relatively short period until time $t_4$. Further pulses of current are then driven through the battery and the cycle is repeated as shown, the charging cycle eventually being terminated. In practice, when a flat battery is being charged the cycle will be repeated many times, but for the purposes of explanation only six cycles are shown in FIG. 1.

It has been found that the change in the battery terminal voltage which occurs during the initiation of a charging pulse, i.e. voltage change $(V_3 - V_2)$ over periods such as $t_1 - t_2$, provides an accurate measure of the state of charge of the battery. When the battery is reaching the fully charged condition, this voltage change increases, i.e. to $(V_{3a} - V_{2a})$ between times $t_6$ and $t_7$. It should be noted that $V_{3a}$ is greater than $V_3$, and that $(V_{3a} - V_{2a})$ is substantially greater than $(V_3 - V_2)$. By monitoring the voltage change and terminating charging when the monitored change exceeds a predetermined threshold, NiCd batteries can be charged rapidly and reliably.

Figure 2:
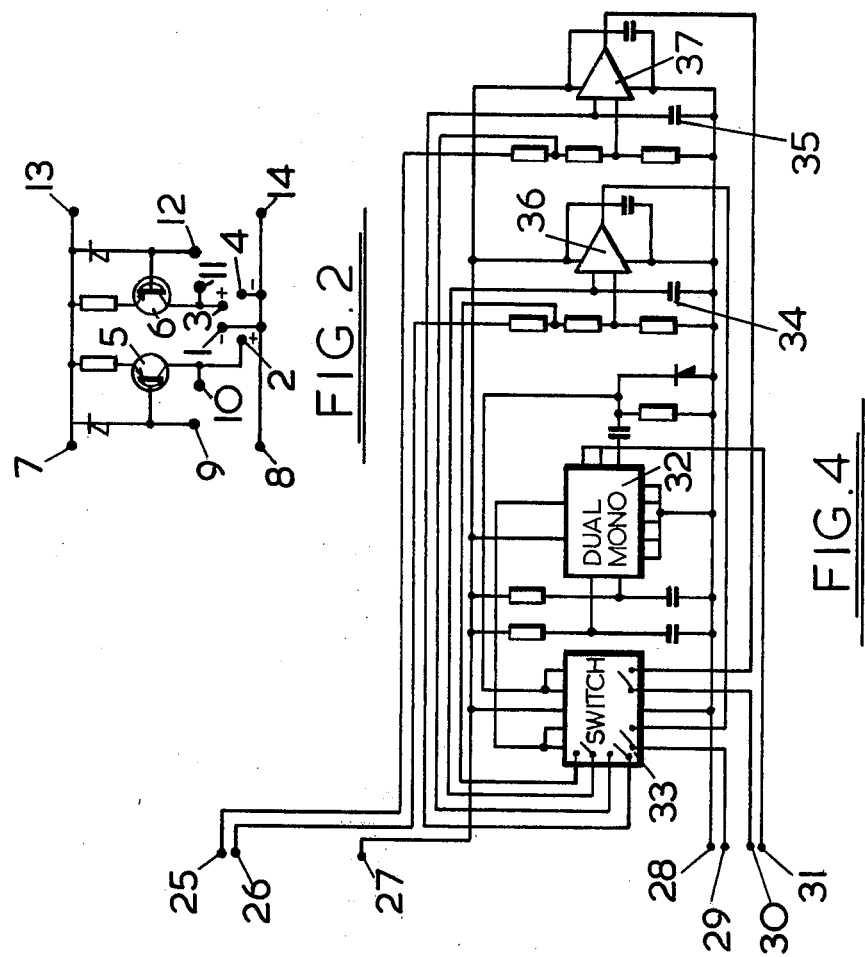

An embodiment of the invention will now be described with reference to FIGS. 2 to 4. Referring to FIG. 2, two batteries may be connected to respective terminals 1, 2 and 3, 4. High current capacity switching transistors 5, 6 when in their conductive states connect the terminals 1, 2 and 3, 4 respectively across terminals 7, 13 and 8, 14 which in turn are connected to a D.C. power supply. The power supply may be the mains suitably transformed and rectified or another battery, i.e. a car battery.

Figure 3:
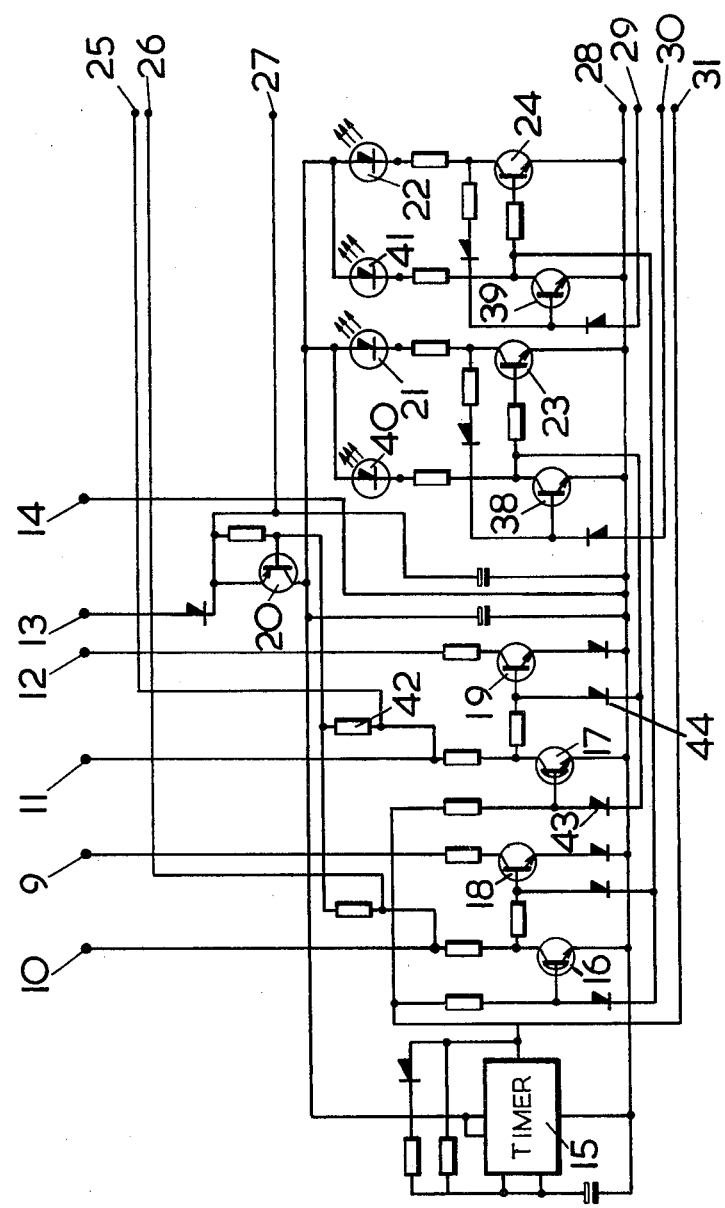

The circuit of FIG. 2 is connected to the circuit of FIG. 3 via terminals 9 to 14 respectively. Referring to FIG. 3, a timer based on a 555 timing circuit 15 cyclically turns on transistors 16, 17 for a period of approximately 2 seconds and then holds transistors 16, 17 off for approximately 10 seconds. When transistors 16, 17 are off, transistors 18 and 19 turn on, thereby turning on transistors 5 and 6 (FIG. 2). A high charging current passes via transistors 5 and 6 to the batteries connected to the terminals 1, 2 and 3, 4. When transistors 16, 17 are on, the batteries are discharged therethrough. Thus a charge/discharge cycle of the type described with reference to FIG. 1 is established, each charging pulse having a duration of 10 seconds, and each discharging period a duration of 2 seconds.

When the charger has a pair of batteries connected to it, a transistor 20 turns on to supply the timing and pulse control circuits. This lights LED's 21, 22 to indicate that both the batteries are on charge, as transistors 23, 24 are in their conductive states.

Referring to FIG. 4, which is connected to FIG. 3 via terminals 25 to 31, two integrated monostable circuits 32 (i.e. a 4538 circuit) and a switch 33 (i.e. a 4016 circuit) sample the voltage of the two batteries immediately the battery goes on charge (i.e. at the beginning of each 10 second charge pulse times $t_1$ and $t_4$ in FIG. 1) and three seconds later (times $t_2$ and $t_5$ in FIG. 1). This sampling is initiated by the timer 15 (FIG. 3) which triggers the monostable 32 via terminal 31 (FIGS. 3 and 4). This causes the capacitors 34, 35 to charge via switch 33 which is closed for approximately 100 mS in dependence upon the voltages across the batteries which appear at terminals 25, 26, i.e. at times $t_1$, $t_4$, and $t_6$. These sampled voltages are compared with the voltage across the batteries appearing at terminals 25, 26 by comparator circuits 36, 37. Three seconds after the capacitors 34 and 35 are charged the output voltages of the comparator circuits 36 and 37 are sampled by the switch 33 under the control of the monostable 32. These output voltages appear at terminals 29 and 30. If at the time of sampling the output of the comparators the terminal battery voltage sampled at one input of the comparators exceeds the stored battery terminal voltage sampled at e.g. times $t_1$ and $t_4$ by a predetermined percentage, the associated comparator turns on the transistor 38 or 39 (FIG. 3) to which its output is connected.

If for example the battery being monitored by comparator 37 reaches full charge, comparator 37 turns on transistor 38, illuminating LED 40 to indicate "battery charged" and extinguishing LED 21. In addition transistor 38 disables the charge and discharge circuits via diodes 43 and 44. The transistors 38 and 23 form a bistable circuit. The 'charged' battery does however continue to receive a trickle charge via the base of transistor 20 and resistor 42. Equivalent circuitry reacts in the same manner if comparator 36 turns on transistor 39.

The above description refers to the charging of two batteries. It will of course be appreciated that the charger can be used to charge the two halves of for example a 2×5 cell 1.2 Ampere Hour battery. With the described charger a fully discharged battery can be fully charged in approximately 15 minutes compared with for example 1 hour with previously available chargers. If a fully charged battery is placed on charge, it will be rejected in one cycle of the charging circuit, i.e. 10 seconds. In the event that the two halves of the battery take substantially different times to charge, this generally indicates a failing battery or a charge fault. When the "battery charged" LED's light the battery can be either removed immediately or left indefinitely on the charger.

A normal (C×0.1) charge outlet may be provided if desired in addition to the rapid charge circuits described.

In sealed NiCd batteries, the electrodes are very closely spaced. This directly affects its fast charging capability. Although the chemical equation which describes the process taking place in NiCd batteries appear to show a balance of oxygen and hydrogen in their initial and final states, the physical construction of a NiCd battery limits the rate at which conversion can take place. This arises from the differences in the ionic velocities which prevail. In general, limits on charging current are set to cater for this effect (in the case of practical batteries). In the practical situation of closely spaced electrodes, this matter is aggrevated by the diameter of the generated gas bubbles becoming comparable to electrode spacing. When this is the case, uneven chemical forming of the electrode plates can occur.

It is believed that gas bubbles, arising as a result of the 'plate-forming-reaction-time' being less than that of the intermediate reactions, may be the major cause why most reports of prior high current charging systems do not show a full charge acquisition. This phenomenon does not seem apparent in the case of the described charger, presumably because the regular discharging periods, irrespective of the state of the battery, repeatedly degas the battery, thus ensuring an even forming of the surface. This constitutes a further substantial improvement over previously available rapid charge.

The 10 second charge to 2 second discharge relationship selected for the described charger has been found to produce very good results. A discharge period of less than about 2 seconds is found to be less desirable, presumably because the degassing of the battery is a relatively slow process. Equally it takes about 3 seconds for the charging voltage to build up, probably because of the ionic velocities involved. The elapsed time between the two terminal voltage measurements should be as short as possible to minimise temperature change effects and the like, and it is for this reason that in the described charger the two measurements are made at the start of the charging pulse and 3 seconds later. Although the change of battery voltage during a charge period has been utilised to determine the state of charge of a battery a similar indication can be obtained by sampling the battery voltage during the discharge periods.

The circuit of FIGS. 2 to 4 operates as described when connected to a particular battery type and condition at a particular temperature. Unfortunately such well ordered circumstances are often not found in practice, particularly when dealing with military equipment.

Figure 5:
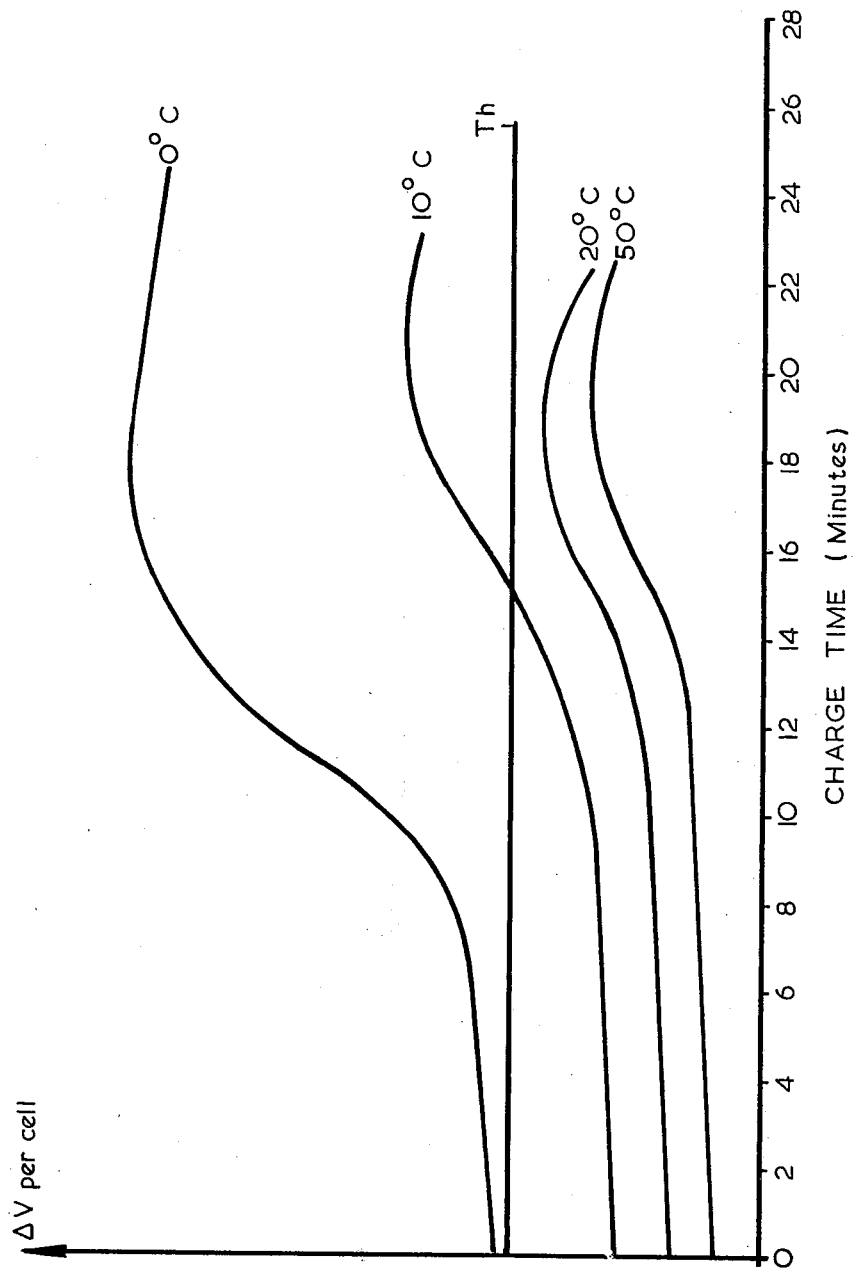
FIG. 5 illustrates the effects of battery temperature upon battery charging characteristics.

Referring now to FIG. 5, the relationship between the measured change in voltage ($\Delta V$) and time for a fixed rate of charging is illustrated for internal battery temperatures of 0° C., 10° C., 20° C. and 50° C. (It will be appreciated that the internal temperature of a battery to be charged will depend upon the ambient temperature to which the battery was exposed before being brought in for charging and can therefore vary widely, e.g. between −30° C. and +55° C.) If the threshold level were set at a level indicated by differential voltage Th, it can be seen that at 10° C. the measured voltage change would pass through the threshold level satisfactorily, but at 0° C. the threshold would always be exceeded (charging could not start) whereas at 20° C. and 50° C. the threshold level would never be reached (overcharging would occur). The variation in these curves has been exaggerated in order to illustrate the points more clearly.

Figure 6:
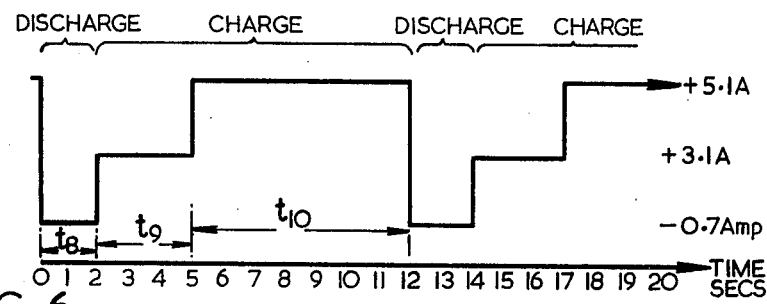
FIGS. 6 and 7 show charging current waveforms of a second embodiment of the invention in which battery temperature is compensated for, FIG. 6 illustrating the case of a cold battery and FIG. 7 the case of a warm battery.
Figure 7:
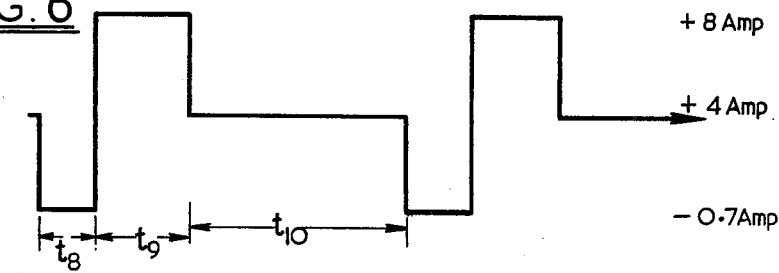

Referring now to FIGS. 6 and 7, modified charging current pulse waveforms are illustrated which are compensated for internal battery temperatures of −25° C. (FIG. 6) and +20° C. (FIG. 7). Each waveform comprises a discharge portion of duration $t_8$, and a charge portion made up of two portions of durations $t_9$ and $t_{10}$ respectively. In the case of FIG. 6, a charging current of 3.1 A is passed for three seconds, and a charging current of 6.1 A is passed for seven seconds. In the case of FIG. 7, a charging current of 8 A is passed for three seconds, and a charging current of 4 A is passed for seven seconds. The total energy supplied in the two cases is thus the same, i.e. the mean charging current is the same.

Figure 8:
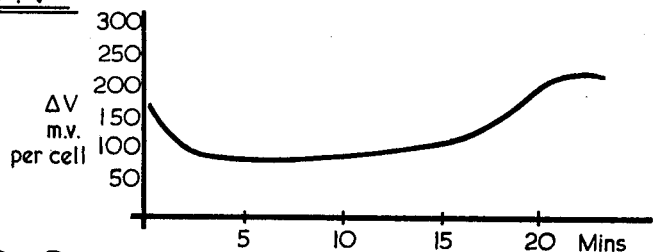
FIGS. 8 and 9 illustrate charging characteristics resulting from the waveforms of FIGS. 6 and 7 respectively.
Figure 9:
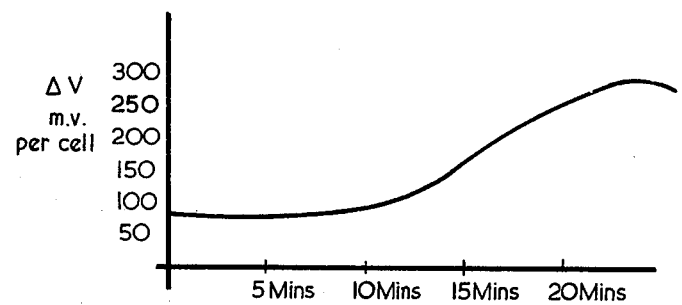

The change in battery terminal voltage is measured over the period $t_9$. By decreasing the charging current during the period $t_9$ with decreasing internal battery temperatures, the variation of the change in battery terminal voltage with time can be minimised. FIGS. 8 and 9 show the variations in the change in terminal voltage with time corresponding to FIGS. 6 and 7 respectively. Although the curves of FIGS. 8 and 9 are not identical, they are sufficiently similar to enable the reliable control of a charging cycle by reference to a fixed voltage change threshold.

Figure 10:
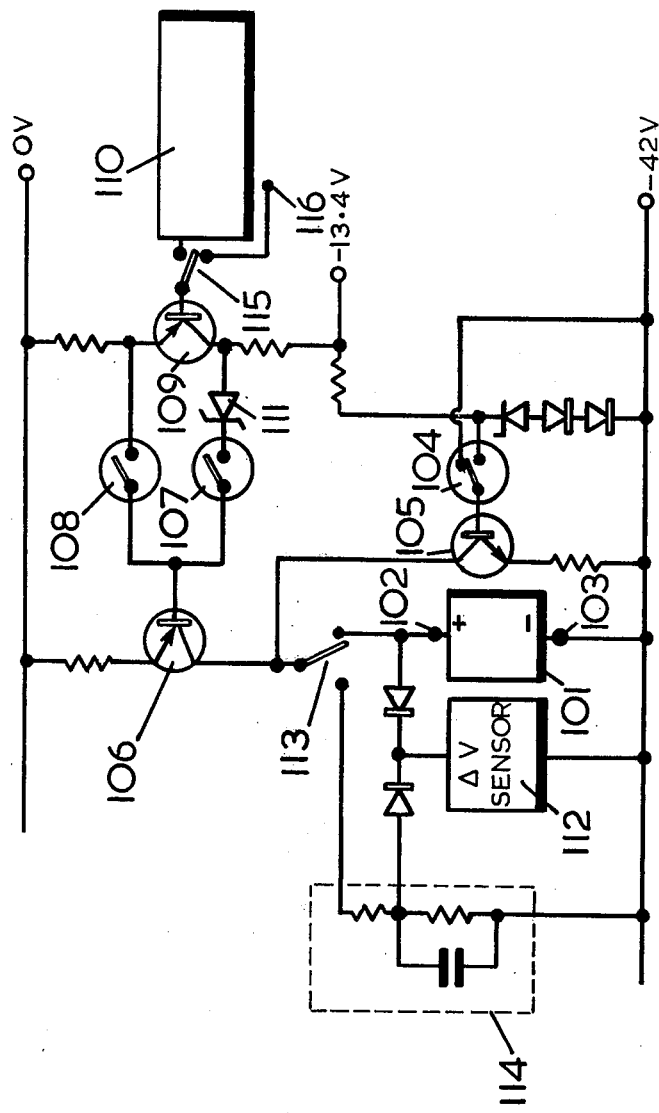
FIG. 10 is a schematic circuit diagram of the current supply circuitry of the second embodiment of the invention.

FIG. 10 is a schematic circuit diagram of a circuit for supplying current waveforms of the type shown in FIGS. 6 and 7. A battery 101 which is to be charged is connected to terminals 102, 103. During a discharge period ($t_8$) a switch 104 is actuated to turn on the constant current discharge transistor 105. During a charging period ($t_9$, $t_{10}$) current is supplied to the battery by transistor 106 the conductivity of which is determined by switches 107 and 108 and a transistor 109. The conductivity of transistor 109 is determined by the output of a temperature sensing circuit 110 which is connected by means not shown to sense the internal temperature of the battery 101. The transistor 109 is connected between two resistors which effectively form a potential divider.

The switch 107 is closed during the period $t_9$ and applies the collector voltage of transistor 109, reduced by the breakdown voltage of zener diode 111, to the base of transistor 106. The switch 108 is open during period $t_9$. The switch 108 is closed during the period $t_{10}$ and applies the emitter voltage of transistor 109 to the base of transistor 106. The switch 107 is open during period $t_{10}$. Thus as the sensed internal battery temperature falls the collector voltage of transistor 109 swings more negative, increasing the $t_{10}$ current, and the emitter voltage of transistor 109 swings more positive, decreasing the $t_9$ current.

The change in the terminal voltage of the battery 101 over the period $t_9$ is sensed by circuit 112. The circuit 112 may be of any suitable type and may comprise for example a monostable circuit triggered by a timing circuit controlling the cyclical charge/discharge sequence to sample the battery terminal voltage at two instants within period $t_9$, a comparator for comparing the two sampled voltages, and a bistable circuit for providing a maintained output when the comparator detects a predetermined difference between the two sampled voltages.

A test switch 113 is provided which when actuated connects a simulated battery 114 to the charger circuit to enable the operation of the sensing circuit 112 to be checked. A further test switch 115 is provided which when actuated connects a simulated "battery at 20° C." input on terminal 116 to transistor 109 to enable the operation of the charging current supply circuit to be tested.

It will be appreciated that the switches 104, 107, 108, 113 and 115 which are schematically illustrated will in general be solid state devices.

Figure 11:
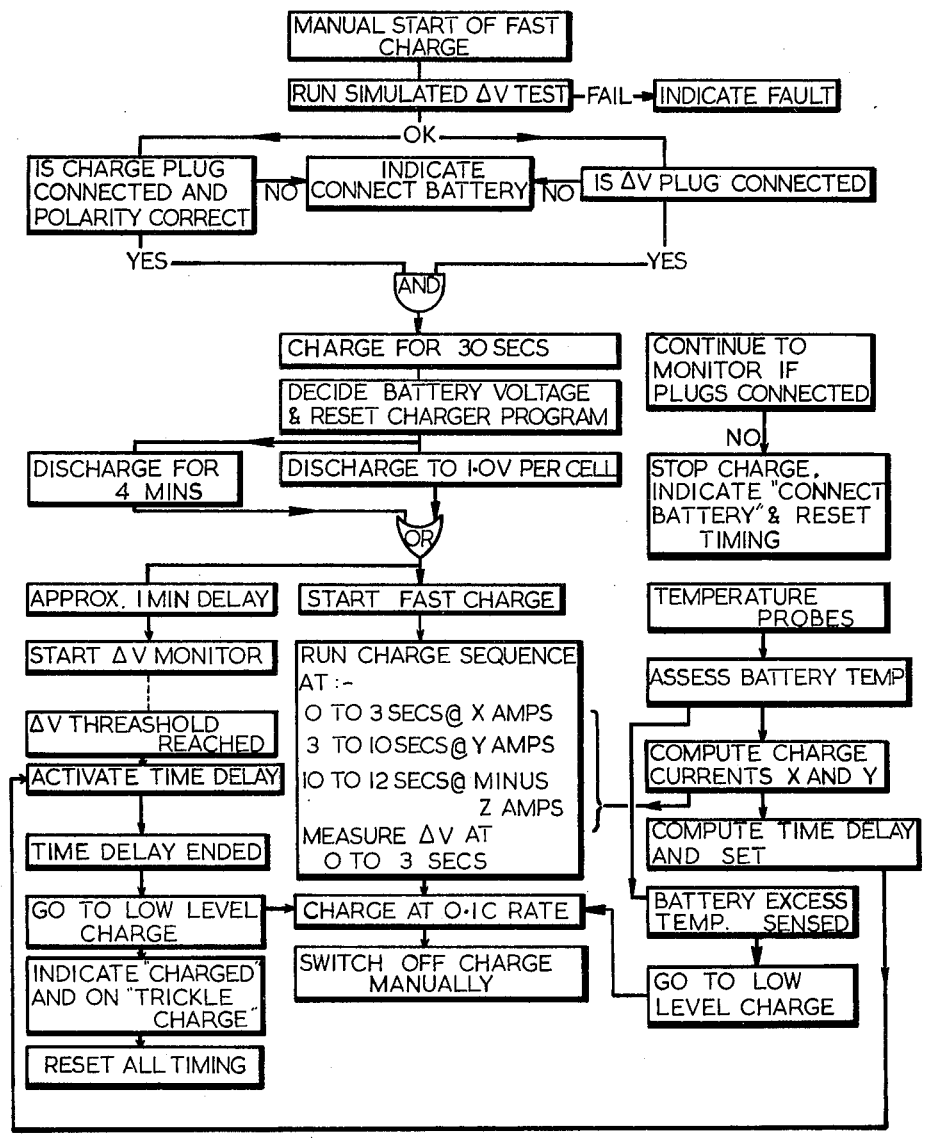
FIG. 11 is a flow diagram illustrating the operating sequence of the second embodiment of the invention.

Referring now to FIG. 11, an operating cycle flow chart of a charger according to the invention will be described. The operating cycle is initiated manually by an operator who connects a battery to the charger and actuates a start switch. Thereafter operation is automatic.

After manual initiation by the operator, a test is made to see that the voltage change sensing circuit 112 (FIG. 10) is operating, as this is a crucial part of the system. This is done by actuating switch 113. If a failure is found, this is indicated and the sequence stops. If no failure is found, a check is made to ensure that the main current carrying charger plug and the voltage change and temperature sense plugs are connected to the battery. This is essential on some batteries in which it is necessary to use two sets of connections to avoid sensing a voltage drop which occurs on an internal charge lead. Throughout the charge sequence these "plugs connected" monitors are operative. Should there be a disconnection, the fault is visually indicated, the charge sequence is stopped and all timing circuits are reset.

Following the plug check, if no failure is indicated, the battery is charged for long enough (e.g. 30 seconds) to allow a 'flat' battery to reach its nominal voltage. This voltage is then sensed to enable the charger to compensate for the nominal voltage of the battery being charged.

The battery is then discharged for four minutes. This is because the battery could already be fully charged, and under the charge sequence to be followed it could get a four minute charge even if initially fully charged. Thus overcharging is prevented. In parallel with the four minute discharge, the battery voltage is sensed and if it drops to 1.0 VDC per cell, which is indicative of a flat battery the four minute discharge is inhibited. This prevents unnecessarily discharging a flat battery which would not only waste time but could cause a cell or cells to become excessively reverse charged.

The fast charge sequence is then started. Temperature probes sense the internal battery temperature. This information is used to set the discharge current (z) during period $t_8$ and the charge currents (X and Y) during periods $t_9$ and $t_{10}$ (see FIGS. 6 and 7). As described above, by decreasing the "$t_9$" current X with decreasing temperature, it is possible to get $\Delta V/\Delta$ time curves which are similar even for widely differing temperatures. It is also possible to slow down the charge rate at the very extremes of the temperature range.

The voltage change sensing circuit becomes operative after a delay of approximately one minute. This prevents the circuit responding to the large voltage change transients which appear during the start of charge of a flat battery. When the predetermined voltage change threshold is reached, a time delay circuit is activated. This sets up a time-to-go for the completion of charge. That delay time may be a function of temperature, and if so the temperature sense circuits will be arranged to compute and set the length of time delay needed to allow the battery to become fully charged. Thus it is seen that the threshold detection is not used directly to switch off the fast charge but rather to determine a "time-to-go" for completion of charge. This enables the threshold level to be set at a safe level below the average peak of the voltage change versus time characteristic. This greatly reduces the probability of the threshold not being reached. At the completion of fast charge, the charge continues at the low rate of approximately 0.1 C (C being the rated charging capacity) until the charger is switched off. This allows an extra "topping up" to take place if the operator is not ready to remove the battery from the charger.

The fast charge sequence will also be terminated if the temperature sensors either detect an excess internal battery temperature (e.g. 60° C.) or an excessively high internal-to-case battery temperature (e.g. 30° C.).

A battery could be designed the characteristics of which are such as to enable a charger of the above-described type to be connected by a single plug.

Figure 12:
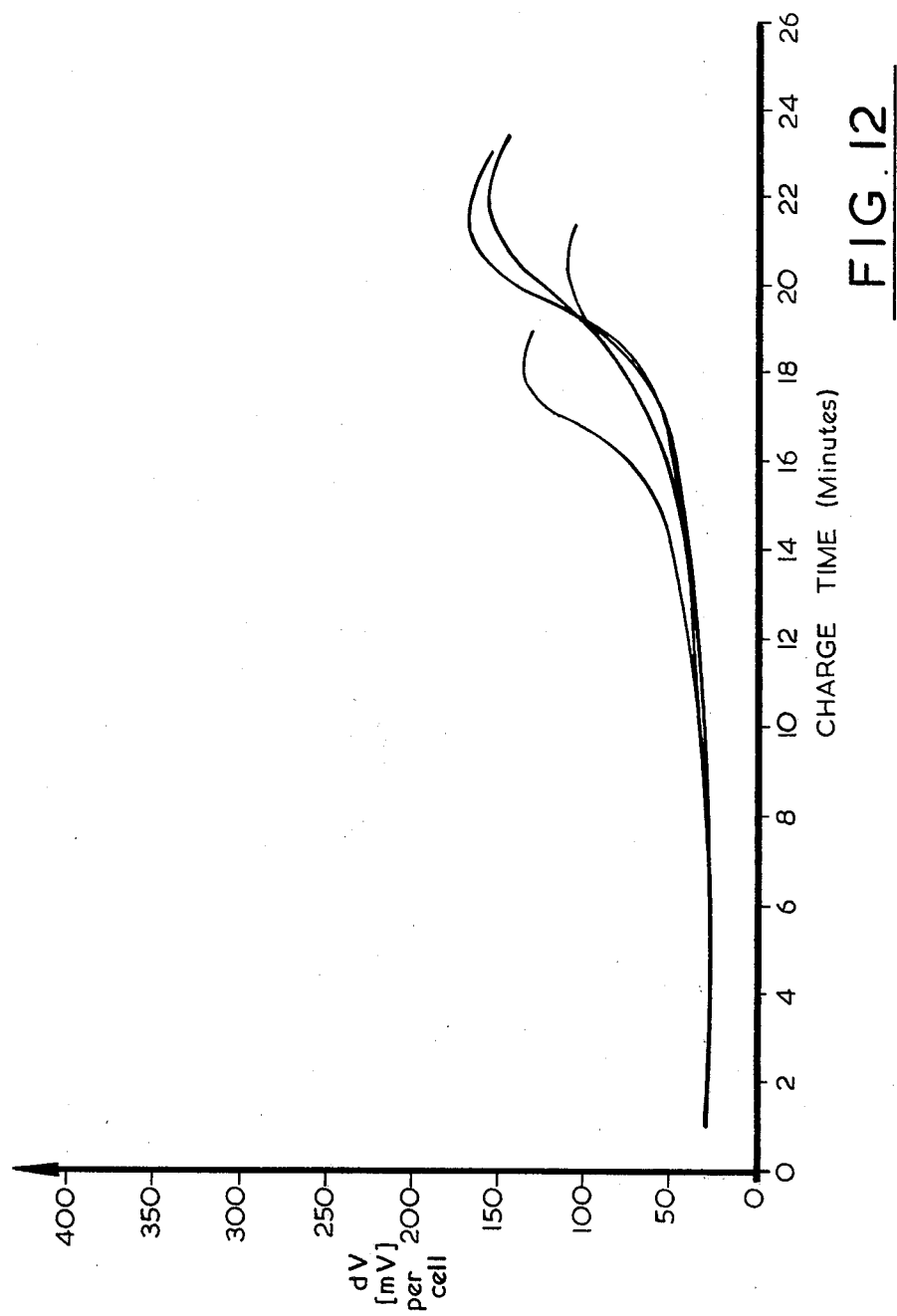
FIGS. 12 and 13 show further curves of measured voltage change versus time for hot and cold batteries respectively.
Figure 13:
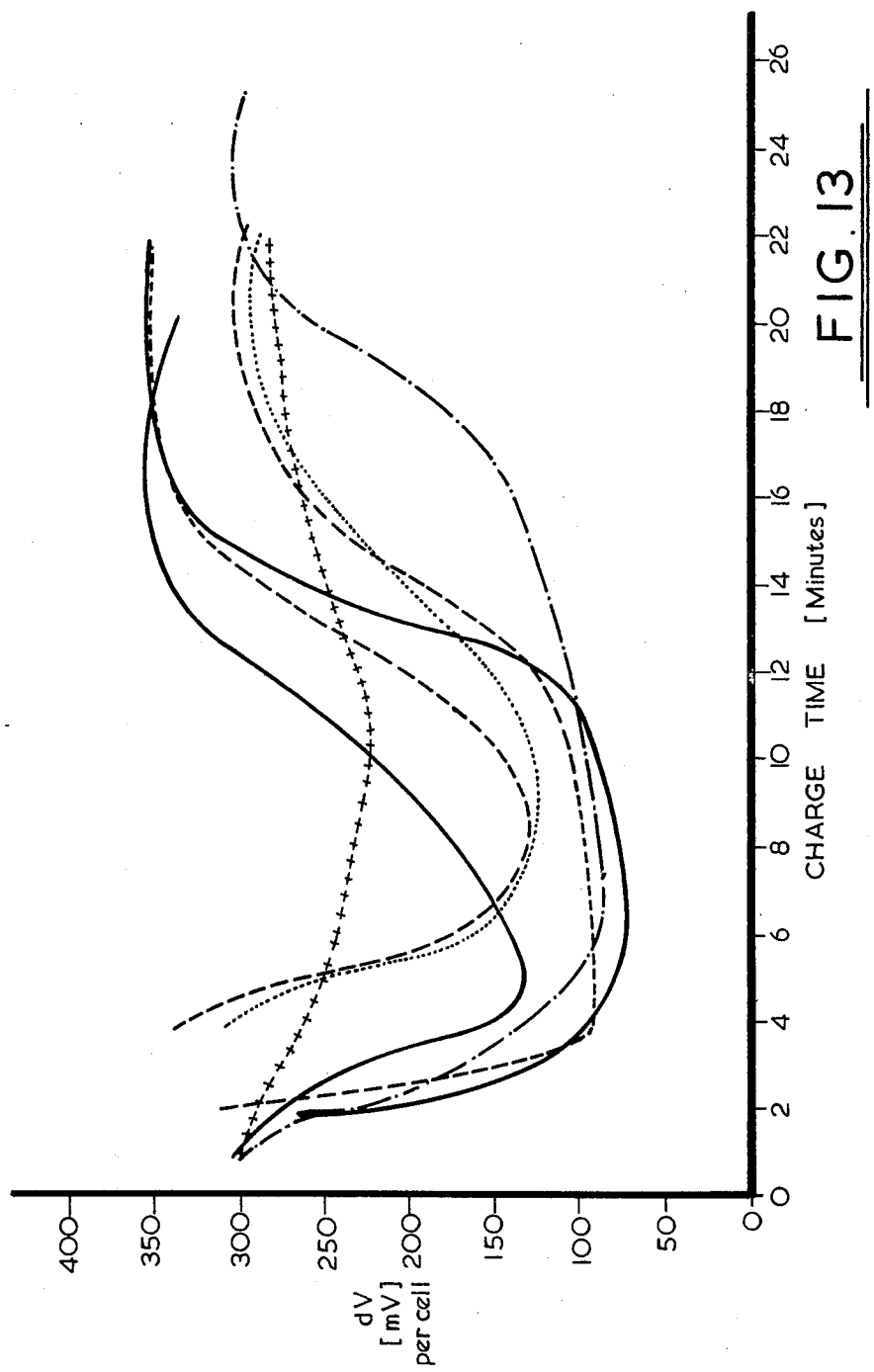

FIGS. 12 and 13 show further measured voltage change versus time curves, FIG. 12 showing curves for a series of different batteries of varying ages and general condition all at high temperatures (greater than 50° C.) and FIG. 13 showing curves for a similar series of cold batteries (−25° C.). The charging cycle in FIG. 12 is 3 seconds at 8 A, 7 seconds at 4 A, and 2 seconds at minus 0.7 A. The charging cycle in FIG. 13 is 3 seconds at 3.1 A, 7 seconds at 5.9 A, and 2 seconds at −0.7 A.

It can be seen that given similar thermal conditions and the same charging pulse sequence, an assortment of different batteries can exhibit different characteristics. In particular, the maximum measured voltage change varies widely which causes problems when using detection of a fixed threshold level to terminate charging. It will however be noted that in each curve of FIGS. 12 and 13 (and FIG. 5) there is a point of inflexion where the rate of change of the slope of the curve changes from positive to negative. This makes it possible to terminate a charging sequence by detecting the point of inflexion rather than an absolute value of the measured voltage change.

Figure 14:
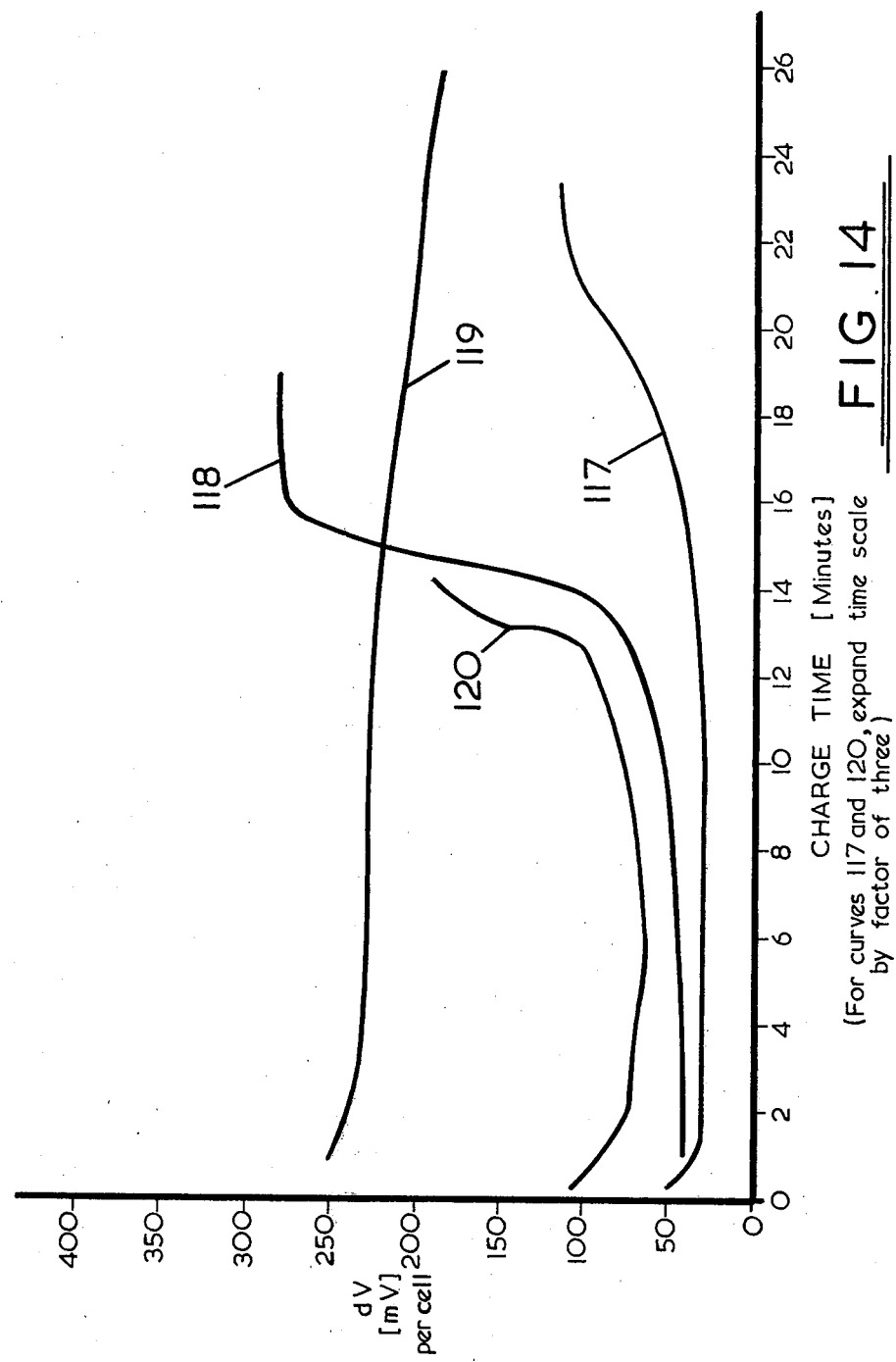
FIG. 14 shows further curves of measured voltage change versus time for hot and cold batteries to illustrate the effects of varying the mean charging current.

FIG. 14 shows four curves 117, 118, 119 and 120 each representing variations in the measured voltage change with time for the same battery. Curves 117 and 118 represent the case of the battery being warm (+21° C.), curves 119 and 120 the case of the battery being cold (−25° C.). The charge rate is 10 seconds at 2 A, 2 seconds at −2 A for curves 117 and 120, 3 seconds at 8 A, 7 seconds at 4 A, 2 seconds at −0.7 A for curves 118 and 119. It can be seen that the charge rate radically alters the variation of voltage change versus time, a high charge rate being suitable for warm batteries, a low charge rate being suitable for cold batteries. A low charge rate must be used for cold batteries as at a high charge rate the voltage change actually decreases with time.

With a cold battery and high charge rate, the voltage change is high regardless of whether or not the battery is charged. With a warm battery the voltage change is high only if the battery is charged. Accordingly if a battery is discharged and then the voltage change is measured, only a cold battery will exhibit a high voltage change. This makes it possible to identify a cold battery as such even when no direct temperature sensing circuit is incorporated in the battery.

FIGS. 15 to 18 illustrate details of a system which detects points of inflexion in the variation of voltage change versus time and then terminates pulse charging, and which detects cold batteries by performing an initial test charge/discharge sequence on all batteries and selects a lower charging rates when a cold battery is detected.

FIG. 15 is a block diagram of the complete system. A battery to be charged is connected between terminals 121, 122 which are themselves connected to an analogue-to-digital converter 123, a programmable current source 124 and a programmable current load 125. The converter, source and load are controlled by a microprocessor 126 which is turned on by a switch 127.

As shown in FIG. 16, the converter 123 may be a 12 bit binary A/D converter, for example an Intersil ICL 7109. The source 124 may be for example a power supply model SP 684 as available from Power Electronics (London) Limited. The microprocessor may be type MPE-2 as available from Cyfas Limited. The particular components selected are however merely a matter of design choice.

FIG. 17 shows the current load circuit 125 in some detail. An enable input 128 from the microprocessor 126 opens gates 129 and gates 130. Gate 129 then enables the programmable power source unit PSU (reference 124 in FIG. 15) and gates 130 admit the discharge current code inputs from the microprocessor to a digital to analogue converter 131 (type ZN 425E). The discharge current code provides for 0.5 A steps in the discharge current. The analogue output of the converter controls a pair of transistors 132 (type IRF 130) which are connected in series with resistors 133, 134. Lines 135, 136 are connected to the terminals of the battery being charged. A switch 137 can be set to short out resistor 134 so that 24 volt and 12 volt batteries can be handled by the same unit. A potentiometer 138 can be used for fine adjustment of the discharge current as desired.

Referring now to FIG. 18, the operating cycle of the embodiments of FIGS. 15 to 17 will be described. Six separate battery connector stations are provided, and the first step is to connect batteries to one or more of these stations. Connectors are used which identify the type of battery and the unit initially checks that the batteries connected to it are of recognisable type. If so, a charge programme appropriate to that type is selected from the microprocessor memory. If not, a lead fault is indicated and the sequence is terminated. Assuming that the battery type is recognised, the unit looks at the first battery station. If there is no battery there, it then looks at the other stations until one is found.

Once a battery is found, the unit conducts a test charge/discharge cycle. If the measured change in the terminal voltage of the battery is initially higher than a predetermined threshold and remains so during the test, this is assumed to indicate a cold battery and a low charge rate is selected from the microprocessor memory.

The appropriate charge rate having been selected, the charge sequence is run. The output of the power supply unit is monitored and the sequence is terminated if this output exceeds a preset limit. This prevents unduly high charging rates in the event of a power supply fault.

The voltage change is monitored during each charge/discharge cycle and averaged over five cycles. The slope of the averaged voltage change with respect to time and the rate of change of the slope are monitored and charging is continued until the slope is positive and its rate of change is negative, i.e. a point of inflexion near to the fully charged condition of the battery is detected. Charging of the battery is then terminated and the unit looks for another battery at the battery stations. The unit then repeats the above cycle on any located battery or terminates its operation if no other batteries are located.

Averaging of a number of voltage change samples effectively delays the detection of the point of inflexion as well as providing a more reliable smoothed measurement. The delay means that charging is terminated shortly after the point of inflexion is reached so that the charge acquisition is increased and is in fact very near to the maximum possible without risk of damage to the battery.

The unit operates two further routine checks to prevent overcharging. Firstly the duration of each charge sequence is measured and the sequence is automatically terminated if it exceeds a threshold related to the type of battery and the selected rate of charge. Secondly if a maximum occurs in the measured voltage change (i.e. slope zero but going negative) and no point of inflexion has been detected, the sequence is automatically terminated.

The measured duration of each charge sequence is, assuming the sequence is not terminated due to an excessive duration, a measure of the charge acquired by the battery as a result of the charge sequence. Accordingly if the battery is fully discharged prior to charging, and given that charging is terminated accurately when the battery is fully charged, the duration of each charge sequence when considered in combination with the charge rate is a measure of the ability of the battery to accept charge. This is a very important parameter as it enables failing batteries to be discarded when for example charge acquisition drops below 70% of a nominal value for the battery in question.

The operating sequences illustrated in FIGS. 11 and 18 are implemented using conventional microprocessor equipment and programming techniques within the normal competence of persons experienced in the application of microprocessors.

The embodiments of the battery charger of the invention described above are concerned with charging NiCd batteries. Similar techniques are capable however of satisfactorily charging batteries other than NiCd batteries, in particular lead/acid batteries. In addition, silver/zinc, nickel/zinc and nickel/iron batteries for example exhibit characteristics such that they too can be satisfactorily charged.

It will be appreciated that as the charger described can handle batteries at a wide range of internal temperatures, in some circumstances it will be possible to dispense with the thermal insulation normally incorporated in NiCd batteries of the sort used in mobile radio equipment for example.

We claim:

1. A battery charger comprising means for supplying a cyclic sequence of charging pulses of charging current of a predetermined charging pulse period of the order of several seconds to a battery interspersed with discharge pulses of a predetermined discharge pulse period of the order of greater than a second for discharging the battery during the charging pulse interpulse period, means for measuring the change in the battery terminal voltage over a further predetermined period during one of said pulse periods, and means for processing said change of battery voltage to derive a condition for terminating the pulse charging of the battery in response to the measured voltage change.

2. A battery charger according to claim 1, wherein the measuring means is adapted to measure the change in the battery terminal voltage during a period starting at the beginning of a charging pulse.

3. A battery charger according to claim 1, wherein the terminating means is adapted to terminate pulse charging when the measured voltage change exceeds a predetermined threshold.

4. A battery charger according to claim 3, characterised by a first current control device connected in series with the battery across a charging current supply, a second current control device connected across the terminals of the battery, a timing circuit for cyclically turning the second current control device on and off, and means for turning the first current control device on when the second current control device is off.

5. A battery charger according to claim 4, characterised by a monostable circuit triggered by the timing circuit for sampling the battery terminal voltage when the first current control device is turned on and at a predetermined interval thereafter, a comparator for comparing the two sampled voltages, and a bistable circuit for holding both current control devices off when the comparator detects a predetermined difference between the two sampled voltages.

6. A battery charger according to claim 4, wherein the timing circuit is effective to supply charging current pulses of 10 second duration and to discharge the battery for periods of 2 seconds duration.

7. A battery charger as claimed in any one of claims 4 to 6 in which the current control devices are transistors.

8. A battery charger according to claim 1, wherein means are provided for monitoring the internal temperature of the battery by means of discharging the battery with a predetermined charge and testing the voltage change magnitudes at two different times to determine temperature, and means are provided for modifying the current through the battery to compensate for the monitored internal battery temperature such that variations in the measured voltage change with internal battery temperature are minimised.

9. A battery charger according to claim 8, characterised in that the controlling means are operative to terminate charging a predetermined period after the detecting means detects that the measured voltage change exceeds said predetermined threshold.

10. A battery charger comprising means for supplying pulses of charging current to a battery and means for discharging the battery by a current discharge pulse during the interpulse period characterised by means for measuring the change in the battery terminal voltage over a predetermined period during one of said pulses, means for terminating the pulse charging of the battery when the measured battery voltage change exhibits a predetermined characteristic, and means for modifying the current through the battery in response to the change in battery temperature, wherein the current modifying means comprise means for modifying the amplitude of the current in the first portion of each charging pulse such that the amplitude increases with increasing internal battery temperature, and means for modifying the amplitude of the current in a second portion of each charging pulse to maintain the mean charging current substantially constant.

11. A battery charger according to claim 10, characterised in that the charging current amplitude modifying means comprises a first solid state switch connected in series with the battery, a second solid state switch connected between two resistors forming a potential divider and controlled by a signal representative of the internal battery temperature, and switches connecting a control terminal of the first solid state switch to respective sides of the second solid state switch.

12. A battery charger according to claim 10, wherein the means for monitoring the internal temperature of a battery to be charged comprise means for conducting a test charge/discharge sequence before the main charging sequence, means for determining the measured voltage change at the beginning of the test sequence, means for determining the measured voltage change after test discharge, and means for reducing the charge rate of the main charging sequence if the voltage change determined after the test discharge is not substantially less than the voltage change at the beginning of the test sequence.

13. A battery charger according to claim 12, wherein means are provided to detect when the slope of the variation of the measured voltage change is positive, the terminating means being adapted to terminate pulse charging only when the slope is positive at the time that a point of inflexion is detected.

14. A battery charger comprising means for supplying pulses of charging current to a battery and means for discharging the battery by a current discharge pulse during the interpulse period characterised by means for measuring the change in the battery terminal voltage over a predetermined period during one of said pulses, means for terminating the pulse charging of the battery when the measured battery temperature exhibits a predetermined characteristic, and means for modifying the current through the battery in response to the change in battery temperature, wherein the terminating means is adapted to detect a point of inflection in the variation of the measured voltage with time, and to terminate pulse charging when a point of inflection is detected, and wherein a series of consecutively sampled measurements of the voltage change are averaged to smooth the measurement of the voltage change and to delay termination of pulse charging.

* * * * *